(12) United States Patent
Evans et al.

(10) Patent No.: US 9,205,769 B2
(45) Date of Patent: Dec. 8, 2015

(54) HIDDEN WASTEBASKET

(71) Applicant: Moor Innovative Technologies, LLC, Charlotte, NC (US)

(72) Inventors: Elaine C. Evans, Charlotte, NC (US); Felicia Cunningham, Clayton, NC (US); Kenta S. Evans, Charlotte, NC (US)

(73) Assignee: Moor Innovative Technologies, LLC, Charlotte, NC (US)

( * ) Notice: Subject to any disclaimer, the term of this patent is extended or adjusted under 35 U.S.C. 154(b) by 67 days.

(21) Appl. No.: 14/162,422

(22) Filed: Jan. 23, 2014

(65) Prior Publication Data

US 2015/0203015 A1  Jul. 23, 2015

(51) Int. Cl.
*B60N 3/08* (2006.01)
*B65F 1/00* (2006.01)
*B65F 1/14* (2006.01)
*E05B 83/30* (2014.01)
*B60R 11/00* (2006.01)

(52) U.S. Cl.
CPC .............. *B60N 3/08* (2013.01); *B65F 1/0006* (2013.01); *B65F 1/1415* (2013.01); *E05B 83/30* (2013.01); *B60R 2011/0047* (2013.01); *B60R 2011/0082* (2013.01)

(58) Field of Classification Search
CPC ............. B60R 7/06; B60R 2011/0082; B60R 2011/0047; E05B 83/30; B65F 1/1415; B65F 1/0006; B60N 3/08
USPC .......................... 296/37.12, 37.1, 37.8, 37.15
See application file for complete search history.

(56) References Cited

U.S. PATENT DOCUMENTS

| | | |
|---|---|---|
| 2,778,553 A | 1/1957 | Satrom et al. |
| 3,848,841 A | 11/1974 | Rafeldt |
| 4,034,079 A | 7/1977 | Schoonman |
| 5,353,950 A | 10/1994 | Taylor et al. |
| 5,890,756 A | 4/1999 | Pranger et al. |
| 5,938,094 A | 8/1999 | Forhan et al. |
| 6,582,002 B2 | 6/2003 | Hogan et al. |
| 6,705,690 B1 | 3/2004 | O'Brien |
| 6,854,779 B2 | 2/2005 | Gehring et al. |
| 6,971,697 B2 | 12/2005 | Morales |
| 7,770,952 B2 | 8/2010 | Hanzel |
| 2010/0282755 A1* | 11/2010 | Kim .................... 220/495.07 |

FOREIGN PATENT DOCUMENTS

JP    11348638 A    12/1999

* cited by examiner

*Primary Examiner* — Joseph D Pape
*Assistant Examiner* — Dana Ivey
(74) *Attorney, Agent, or Firm* — Coats & Bennett, P.L.L.C.

(57) ABSTRACT

A waste receptacle assembly moves wholly or partially into and out of a compartment in a motor vehicle. When deployed, the waste receptacle assembly has a receptacle (e.g., bag) formed by continuous tube of bag material that has been closed off on one end. The bag material pays out from a bag supply. Trash and other waste is placed in the receptacle by passing through an aperture in the bag supply. When retracted, the waste receptacle is disposed in a compartment in the vehicle's dashboard, with the compartment advantageously closed off by a door panel so as to contain potential odors from the waste. The bag material may be treated with a suitable sanitizing compound. When full, the bag material forming the receptacle may be pulled downward, cut from the adjacent bag material section, and disposed of. The "new" receptacle may then be placed in service.

20 Claims, 10 Drawing Sheets

HIDDEN WASTEBASKET

BACKGROUND

This application is related to waste receptacles for motor vehicles, for example automobiles, and related methods of use.

People using motor vehicles (e.g., cars, trucks, minivans, boats, and the like) frequently generate trash that needs to be disposed of. For example, people might have remains of a meal, or packaging thereof, or used tissues, that need to be disposed of. Frequently, such waste is either simply dropped on the vehicle's floor, or more desirably, placed in a trash receptacle inside the vehicle. Such trash receptacles may be a simple bag, or may be more elaborate. For example, U.S. Pat. No. 2,778,533 to Satrom discloses a refuse bag for automobiles that is biased closed and is mounted under the glove compartment of a car. Another example is U.S. Pat. No. 5,890,756 to Pranger, which shows a built-in drawer for receiving trash. While these approaches to motor vehicle waste containment have proven useful, they are not ideal for many circumstances. Indeed, two aspects that have proven difficult to deal with are odors that the waste may generate and removal/replacement of the waste receptacle. As such there remains a need for alternative waste receptacles for motor vehicles, and related methods of temporarily storing waste.

SUMMARY

The present application describes a waste receptacle assembly that moves wholly or partially into and out of a compartment in a motor vehicle. When deployed, the waste receptacle assembly has a receptacle (e.g., bag) formed by a portion of a continuous tube of bag material that has been closed off on one end. The tube of bag material pays out from a bag supply. Trash and other waste is placed in the receptacle by passing through an aperture in the bag supply. When retracted, the waste receptacle is disposed in a compartment in the vehicle's dashboard, with the compartment advantageously closed off by a door panel so as to contain potential odors from the waste. Advantageously, the bag material is treated with a suitable compound, or otherwise includes a suitable additive/coating, for sanitizing materials that come into contact with the bag material. When full, the bag material forming the receptacle may be pulled downward, cut from the adjacent bag material section, and disposed of. The "new" receptacle may then be placed in service once the lower portion of the bag material is closed off (e.g., tied in a knot).

In one or more embodiments, a waste containment assembly, movable between a first open configuration and a second closed configuration, is provided. The waste containment assembly includes a vehicle dashboard having a compartment therein, a door panel, and a waste receptacle assembly. The door panel is moveably connected to the dashboard for movement between a closed position and an open position. The waste receptacle assembly is mounted to the dashboard for movement between a retracted configuration and a deployed configuration. In the deployed configuration, at least a portion of the waste receptacle assembly is forwardly disposed outside the compartment so as to be accessible by a user. In the retracted configuration, the waste receptacle assembly is disposed substantially within the compartment. The waste receptacle includes a bag supply and a cutter blade. The bag supply has a central aperture and a downwardly deployable tube of flexible plastic bag material. The central aperture opens on an interior surface of the bag material. A lower portion of the bag material has a first knot so that the bag material forms an enclosed but upwardly open hanging receptacle. The cutter blade is mounted in spaced relation to the bag supply. With the waste containment assembly in the closed configuration: a) the waste receptacle assembly is in its retracted configuration; b) the door panel is in the closed position so as to close off the compartment; and c) access to the central aperture is blocked. With the waste containment assembly in the open configuration: a) the door panel is in the open position; b) the waste receptacle assembly is in its deployed configuration with an upper portion thereof extending forwardly outward from the compartment; and c) the central aperture is accessible from above. The waste receptacle assembly configured so that a user may cut off a receptacle segment of the bag material using the cutter blade when the lower portion of the bag material has been pulled down, leaving a remaining portion of the bag material disposed between the cutter blade and the support ring.

In some embodiments, the waste receptacle assembly may further comprise a support frame mounted in the compartment for sliding movement between a deployed position, where the support frame extends forwardly outward from the compartment, and a retracted position. With the waste containment assembly in the open configuration, the support frame is in its deployed position so as to extend forwardly outward from the compartment, the cutter blade may advantageously be mounted to the support frame in spaced relation to the bag supply. The support frame may be biased toward its deployed position. The door panel may be mounted to the support frame.

In some embodiments, the waste receptacle assembly may be mounted to the dashboard for pivoting movement between the retracted configuration, the deployed configuration, and a replacement configuration. In the deployed configuration, the upper portion of the waste receptacle assembly extends forwardly outward from the compartment and a lower portion of the waste receptacle assembly is disposed in the compartment. In the replacement configuration, the lower portion of the waste receptacle assembly extends forwardly outward from the compartment and the upper portion of the waste receptacle assembly is disposed in the compartment. In the retracted configuration, both the upper portion and the lower portion of the waste receptacle assembly are disposed in the compartment.

In one or more embodiments, the waste container assembly may have one or more of the following characteristics. The waste container may be configured such that the central aperture is blocked while the waste receptacle is positioned so that cutting blade is cutting the bag material. The supply ring may be pivotable relative to the compartment. The bag material may comprise a sanitizing bag material. The bag supply may be ring shaped.

In one or more embodiments, a method of disposing of waste using a waste containment assembly is provided. The method includes depositing waste in a waste receptacle of a waste containment assembly while the waste containment assembly is in an open configuration. The waste containment assembly is moveable between the open configuration and a closed configuration. The waste containment assembly includes a vehicle dashboard having a compartment therein, a door panel, and a waste receptacle assembly. The door panel is moveably mounted to the dashboard for movement between a closed position and a first open position. The waste receptacle assembly is mounted to the dashboard for movement between a retracted configuration and a deployed configuration. In the deployed configuration, at least a portion of the waste receptacle is forwardly disposed outside the compartment so as to be accessible by a user. In the retracted configuration, the waste receptacle assembly is disposed rearwardly with respect to the deployed configuration and disposed substantially within the compartment. The waste receptacle assembly includes a bag supply and a cutter blade. The bag supply has a central aperture and a downwardly deployable tube of flexible plastic bag material. The central aperture opens on an interior surface of the bag material. A lower portion of the bag material has a first knot so that the bag material forms an enclosed but upwardly open hanging receptacle. The cutter blade is mounted in spaced relation to the bag supply. With the waste containment assembly in the closed configuration: a) the waste receptacle assembly is in its retracted configuration; b) the door panel is in the closed position so as to close off the compartment; and c) access to the central aperture is blocked. With the waste containment assembly in the open configuration: a) the door panel is in the open position; b) the waste receptacle assembly is in its deployed configuration with an upper portion thereof extending forwardly outward from the compartment; and c) the central aperture is accessible from above. The method also includes thereafter, moving the waste containment assembly to its closed configuration.

In some embodiments, the method further includes pulling the bag material downward so as to extend below the door panel in a separation configuration; then cutting a lower portion of the bag material from an adjacent section using the cutter blade while the bag material is in the separation configuration so as to form a separated bag; and thereafter, tying a second knot in the adjacent section so that the adjacent section of bag material, still connected to the bag supply, forms another enclosed but upwardly open hanging receptacle; and thereafter, moving the waste receptacle assembly to its retracted configuration. The method may include disposing of the separated bag and/or tying off the separated bag at a location in spaced relation to the first knot.

In some embodiments, the method may include thereafter and in sequence: a) moving the waste containment assembly to its open configuration; b) placing other waste in the receptacle; and c) moving the waste containment assembly to its closed configuration.

In some embodiments, the method may include at least partially sanitizing the waste by contact with the bag material.

In some embodiments, the method may include moving the waste receptacle assembly from its retracted configuration to its deployed configuration by non-rotationally sliding the waste receptacle assembly forwardly outward from the compartment.

In some embodiments, the waste receptacle assembly includes a support frame mounted in the compartment for sliding movement between a deployed position, where the support frame extends forwardly outward from the compartment, and a retracted position. The method may be such that: a) with the waste containment assembly in the open configuration, the support frame is in its deployed position; and b) with the waste containment assembly in the closed configuration, the support frame is in its retracted position.

In some embodiments, the method may include moving the waste receptacle assembly from its retracted configuration to its deployed configuration by pivoting an upper portion of the waste receptacle assembly forwardly outward from the compartment.

In some embodiments, the waste receptacle assembly is mounted to the dashboard for pivoting movement between the retracted configuration, the deployed configuration, and a replacement configuration. The method may be such that: a) in the deployed configuration, the upper portion of the waste receptacle assembly extends forwardly outward from the compartment and a lower portion of the waste receptacle assembly is disposed in the compartment; b) in the replacement configuration, the lower portion of the waste receptacle assembly extends forwardly outward from the compartment and the upper portion of the waste receptacle assembly is disposed in the compartment; and c) in the retracted configuration, both the upper portion and the lower portion of the waste receptacle assembly are disposed in the compartment. The method may then include thereafter moving the waste receptacle assembly from its retracted configuration to its replacement configuration, and while the waste receptacle assembly is in the replacement configuration, cutting the bag material with the cutter blade.

The various aspects discussed above may be used alone or in any combination. The various apparatus disclosed herein may operate according to any combination of various method disclosed herein, and vice versa. Further, the present invention is not limited to the above features and advantages. Indeed, those skilled in the art will recognize additional features and advantages upon reading the following detailed description, and upon viewing the accompanying drawings.

DETAILED DESCRIPTION

As explained further below, in one or more embodiments, the present invention is directed to a waste containment assembly 10 that includes a waste receptacle assembly 20 that moves wholly or partially into and out of a compartment 14 in a motor vehicle 5, and/or a method of using the same. When deployed, the waste receptacle assembly 20 has a receptacle 40 (e.g., bag) formed by a portion of a continuous tube of bag material 34 that has been closed off on one end (e.g., by knot 39). The tube of bag material pays out from a bag supply 30, with the bag supply 30 supported by a moveable support frame 22 in some embodiments. Trash and other waste is placed in the receptacle by passing through an aperture 32 in the bag supply 30. When retracted, the waste receptacle assembly 20 is generally disposed in the compartment 14, with the compartment 14 advantageously closed off by a door panel 16 so as to contain potential odors from the waste. Advantageously, the bag material 34 is treated with a suitable compound, or otherwise includes a suitable additive/coating, for sanitizing materials that come into contact with the bag material 34. When full, the material forming the receptacle 40 may be pulled downward, cut from the adjacent bag material section 44, and disposed of. The "new" receptacle 40 may then be placed in service once the lower portion of the bag material is closed off (e.g., tied in a knot 39). In some embodiments, the waste receptacle assembly 20 slides into and out of the compartment 14. In other embodiments, the waste receptacle assembly 20 may be pivotally mounted so as rotate portions of the waste receptacle assembly 20 relative to the compartment 14 so as to be open or closed as described further below.

Figure 1:
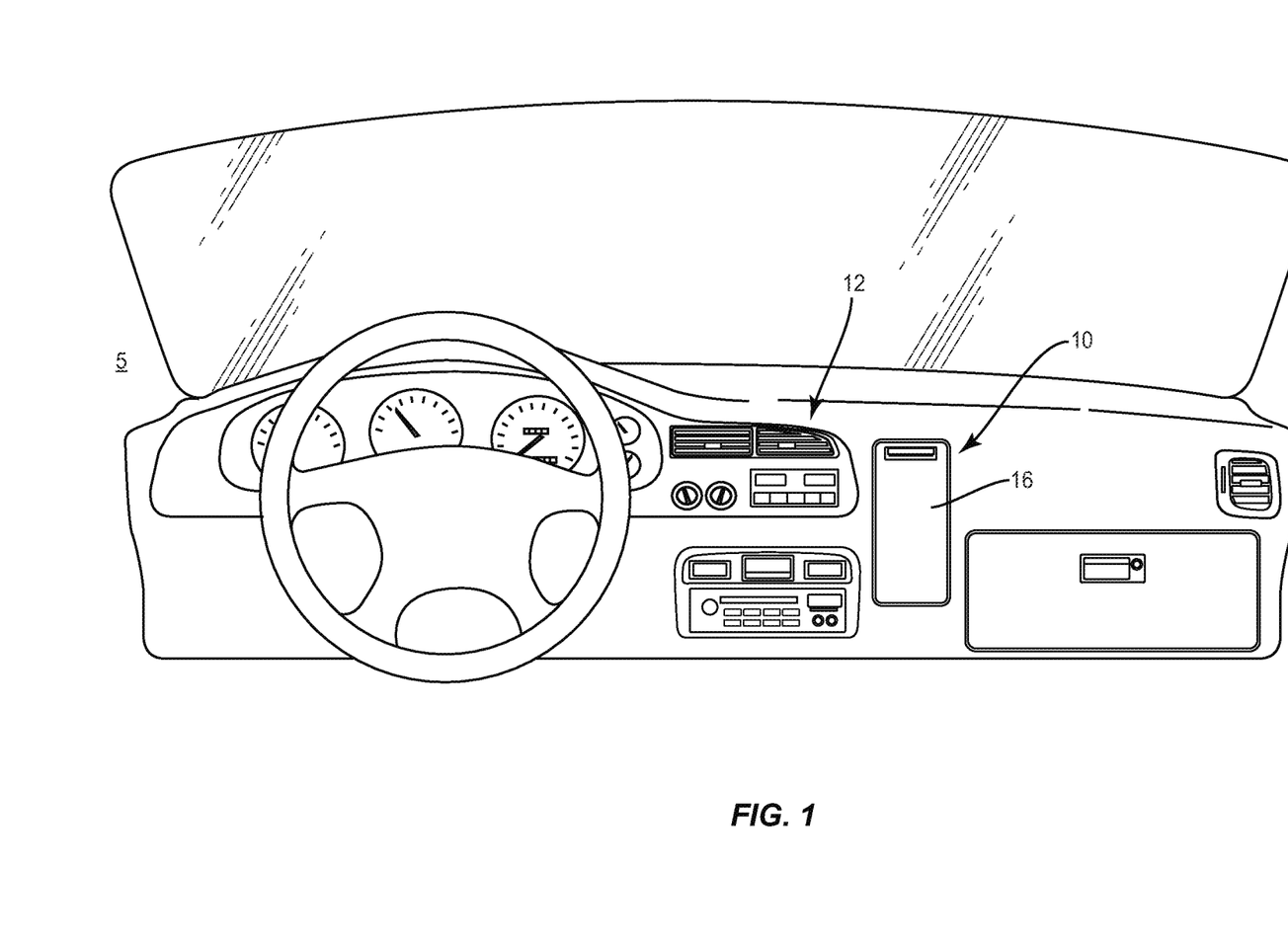
FIG. 1 shows a dashboard area of a motor vehicle showing a waste containment assembly.
Figure 2:
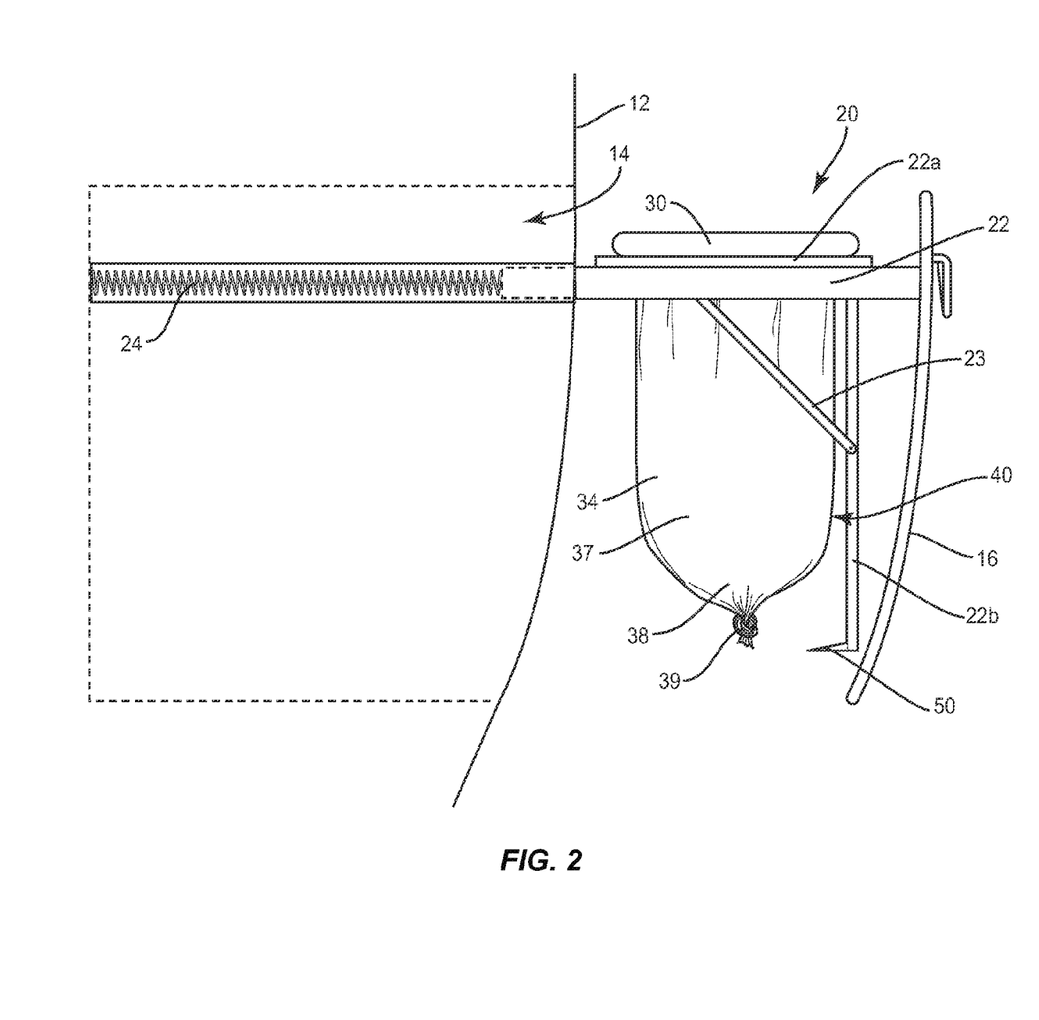
FIG. 2 shows a side view of one sliding embodiment of a waste containment assembly in the open configuration.
Figure 3:
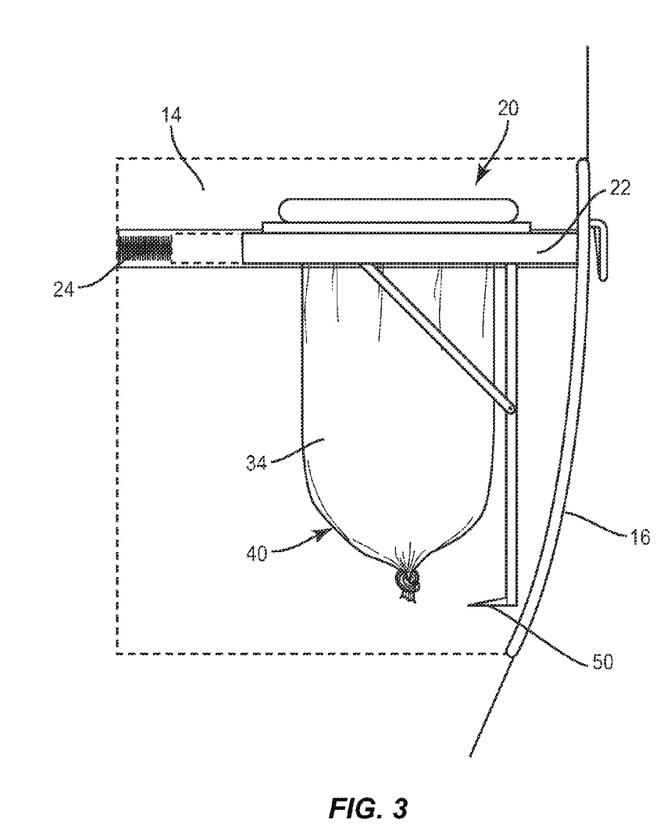
FIG. 3 shows a view similar to FIG. 2, but with the waste containment assembly in the closed configuration.
Figure 4:
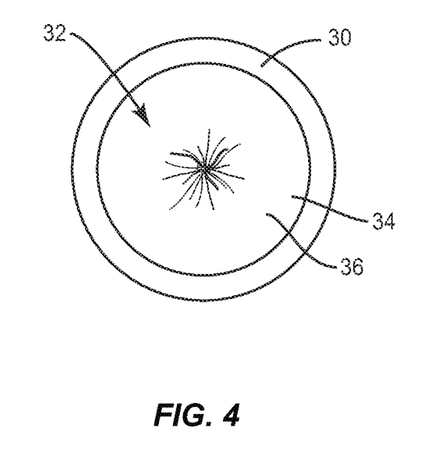
FIG. 4 shows a top view of a bag supply with the associated receptacle.
Figure 5:
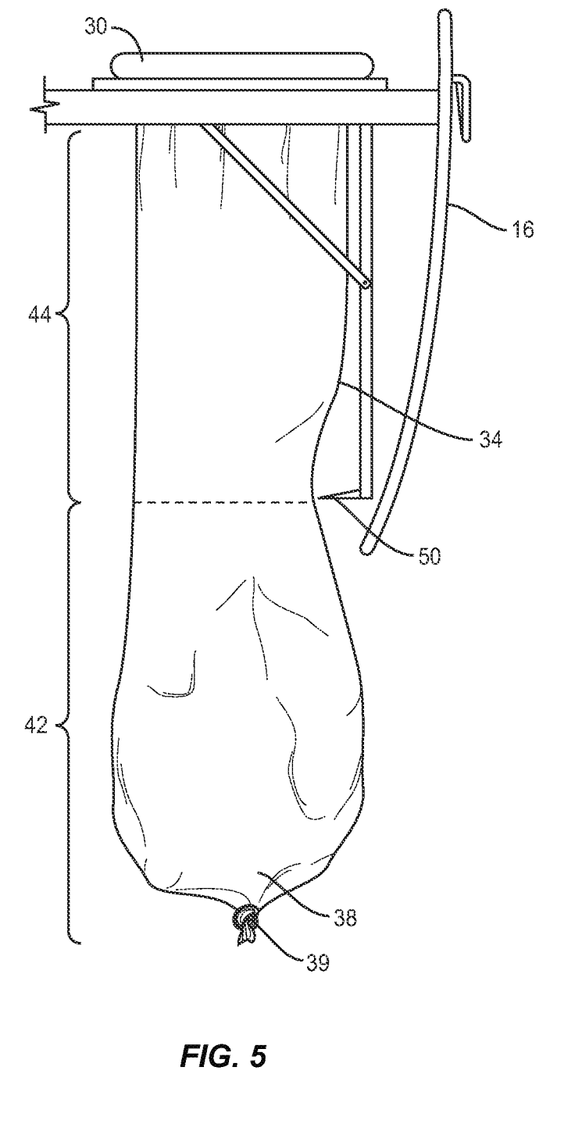
FIG. 5 shows a partial side view of the waste containment assembly of FIG. 2, during a process of receptacle replacement, with the current receptacle pulled downward for cutting by a cutter.

Referring first to FIGS. 1-5, the present application is directed to waste containment assembly, generally indicated at 10, for a motor vehicle 5. As can be appreciated, the motor vehicle may be a car, a truck, a van or minivan, a motor home, a boat, etc. In general, the waste containment assembly 10 includes a vehicle dashboard 12 and a waste receptacle assembly 20 movably mounted to the dashboard 12. The vehicle dashboard 12 includes a compartment 14 therein. Advantageously, the compartment 14 is located between the midpoint of the dashboard 12 and the location of the glove compartment. This preferred location allows the driver of the vehicle 5 to dispose of waste, as described further below, without having to reach too far. The compartment 14 is advantageously enclosed by the dashboard 12 and a moveable door panel 16. The door panel 16 is moveably mounted to the dashboard 12 for movement between an open position (FIG. 2) and a closed position (FIG. 3). As discussed below, the door panel 16 may be mounted to the dashboard 12 via the waste receptacle assembly 20, or mounted directly to the dashboard 12.

The waste receptacle assembly 20 is moveably mounted to the dashboard 12 for movement between a first open configuration (FIG. 2) and a second closed configuration (FIG. 3). As shown in FIG. 2, in the open configuration, at least a portion of the waste receptacle assembly 20 is forwardly disposed outside the compartment 14. As shown in FIG. 3, in the closed configuration, the waste receptacle assembly 20 is disposed so that no portion of the waste receptacle assembly 20 extends farther forward than the door panel 16 in its closed position. Advantageously, the waste receptacle assembly 20 is disposed entirely within the compartment 14 in the retracted configuration; although in other embodiments, one or more portions of the waste receptacle assembly 20 may extend farther rearward than the compartment 14.

For the sliding embodiment of FIGS. 2-5, the waste receptacle assembly 20 includes a support frame 22, a bag supply 30 with associated bag material 34, and a cutter blade 50. The support frame 22 is slidably mounted to the dashboard 12, such as being mounted inside the compartment 14, so that the support frame 22 can slide between a deployed position where the support frame 22 extends outward from the compartment 14 (FIG. 2), and a retracted position where the support frame 22 is retracted into the compartment 14 (FIG. 3). For example, the support frame 22 may include sliding support rails similar to those used for pull-out kitchen drawers, or other sliding connection means known in the mechanical arts. In some embodiments, the support frame 22 is biased outward (toward the deployed position) by a suitable spring 24 or other means known in the art, such as repulsive magnets, etc. The support frame 22 forms a frame structure for supporting the bag supply 30 and the cutter blade 50. Thus, the support frame 22 includes suitable vertical and horizontal frame members 23 that join together to form an upper frame portion 22a and a lower frame portion 22b.

The bag supply 30 is mounted to the upper portion 22a of the support frame 22. The bag material 34 is supplied in the form of a continuous tube of flexible material 34 that pays out from the bag supply 30. As can be appreciated, the tube of bag material 34, when deployed, has an interior surface 36 and an exterior surface 37, with the interior surface 36 facing inward and the exterior surface 37 facing outward. The bag material 34 is disposed about a central aperture 32 formed by the bag supply 30. The central aperture 32 allows access to the bag material 34 hanging from the bag supply 30. When the lower end 38 of the bag material 34 has a knot 39 tied therein, and the bag material 34 is hanging from the bag supply 30, the bag material 34 forms an enclosed but upwardly open receptacle 40 for receiving waste, as explained further below. The bag material 34 is a suitable flexible plastic material known in the art. In some embodiments, the bag material 34 is advantageously treated with a suitable compound, or otherwise includes a suitable additive/coating, for sanitizing materials that come into contact with the bag material 34. For example, bag material 34 may be a self-sanitizing plastic, such a polyethylene, see e.g., U.S. Pat. No. 4,034,079.

The cutter blade 50 is mounted in spaced relation to the bag supply 30, and advantageously mounted to the support frame 22. The distance between the bag supply 30 and the cutter blade 50 helps define a section length for the bag material 34. As shown in FIGS. 2-3, the cutter blade 50 may be a simple stationary blade mounted to the support frame 22. In other embodiments, the cutter blade 50 may be a moveable blade mounted to the support frame 22 for manual movement back and forth along a suitable track/slot for cutting portions of the bag material 34. In some embodiments, the cutter blade 50 may be mounted directly to a lower portion of the backside of door panel 16.

Figure 7:
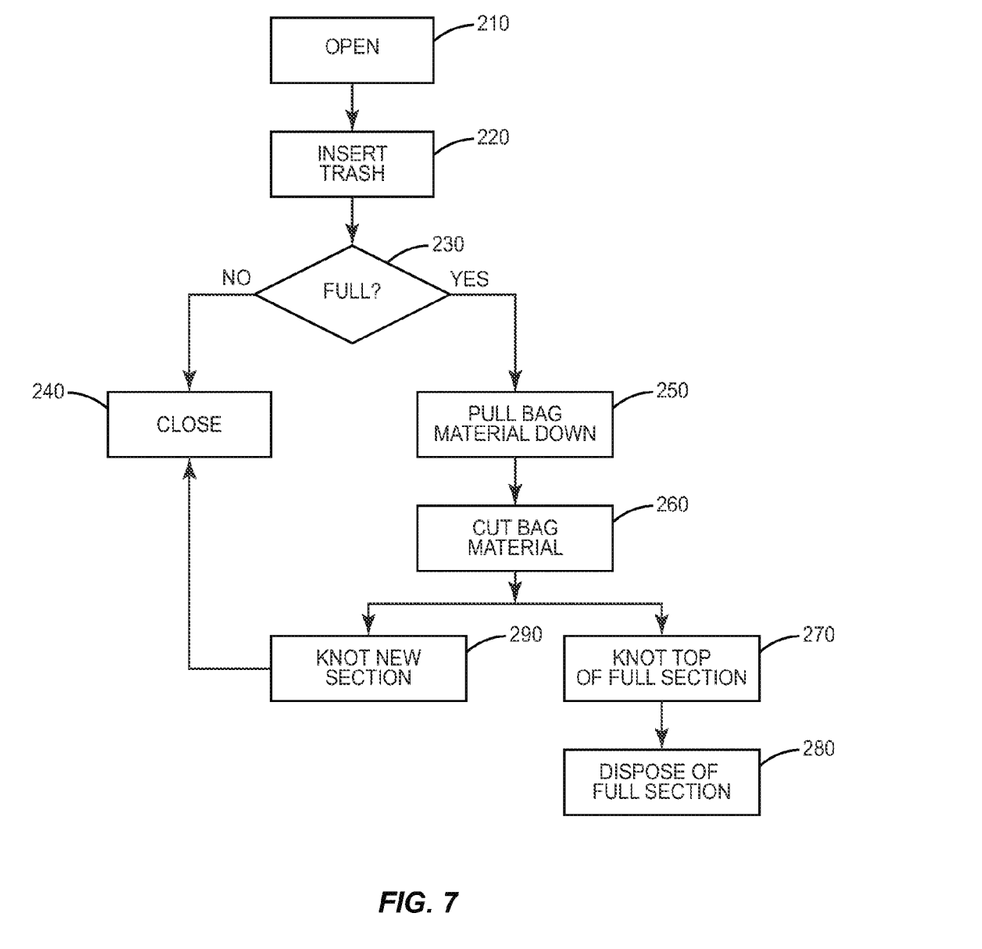
FIG. 7 shows a simplified process flowchart for use of the waste containment assembly.
Figure 8:
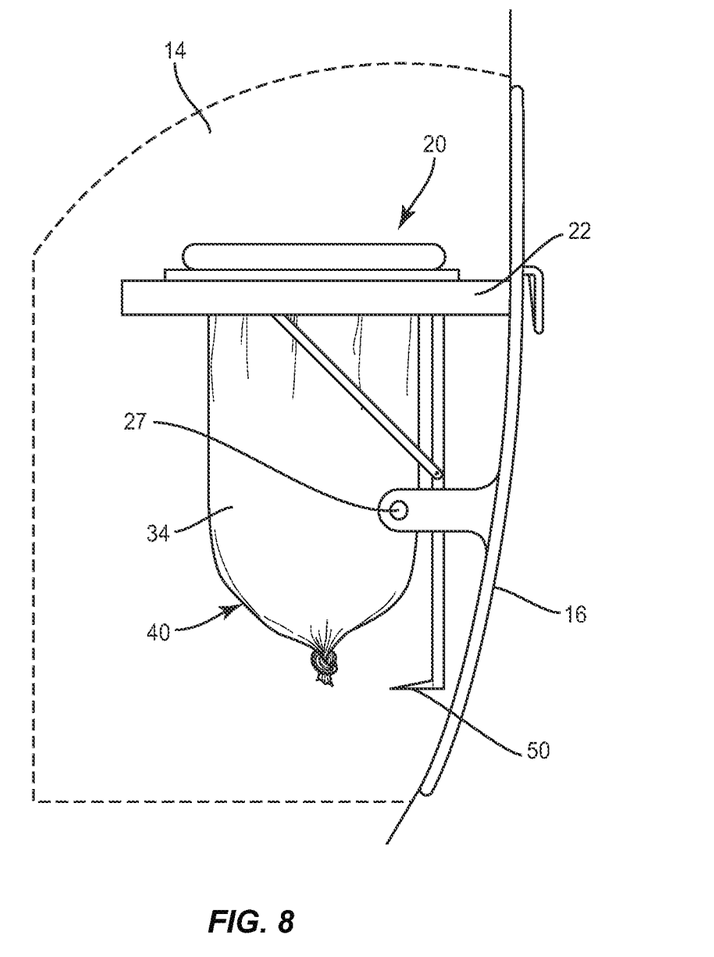
FIG. 8 shows one embodiment of a pivoting waste containment assembly in the closed configuration, with the waste receptacle assembly in the retracted configuration.
Figure 9:
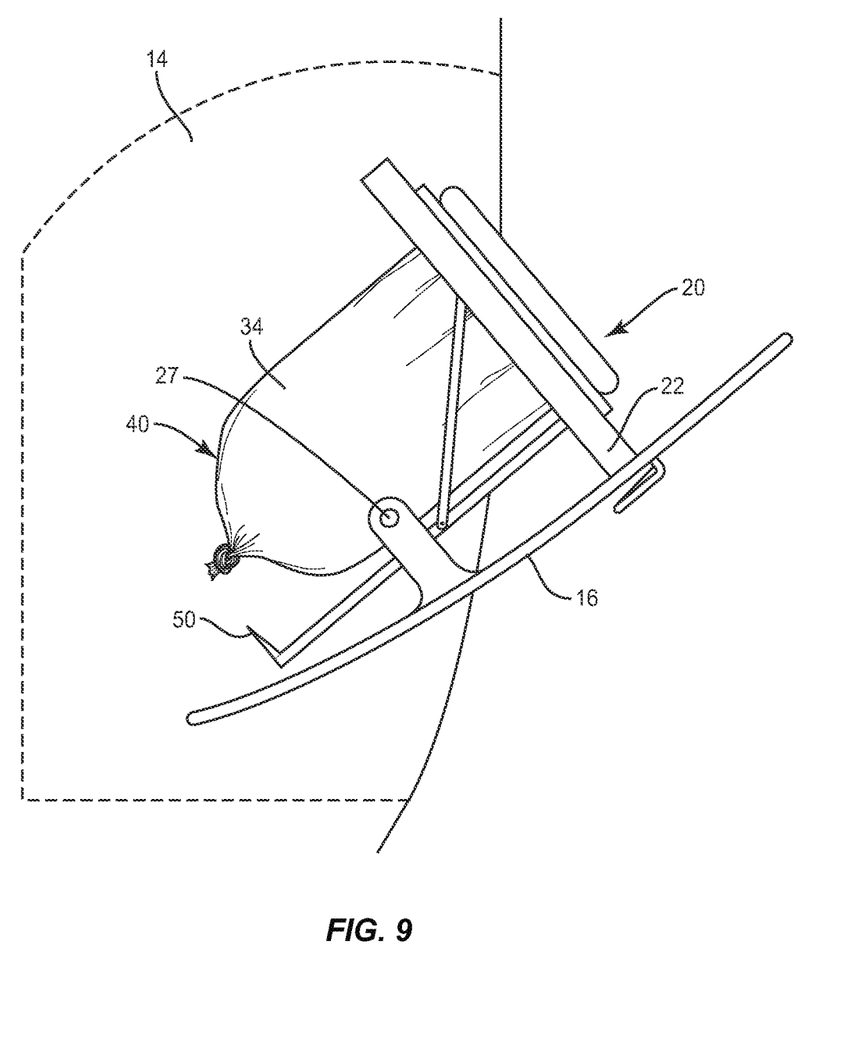
FIG. 9 shows the waste containment assembly of FIG. 8 in the open configuration, with the waste receptacle assembly in the deployed configuration.

The waste containment assembly 10 may be used to temporarily store waste in the vehicle 5. Referring to FIG. 7 and starting from a situation where the waste containment assembly 10 is in the closed configuration, with the waste receptacle assembly 20 in the retracted configuration in the compartment 14 and the door panel 16 closed (see FIG. 3), the user may open the door panel 16 (step 210) by pulling the door panel 16 open or otherwise actuating the door panel 16 to open. The waste receptacle assembly 20 may then move outward to the deployed configuration (see FIG. 2), either as a result of a bias force (e.g., due to a spring) and/or pulled outward by the user. The bag material 34 has a knot 39 in the lower portion 38 thereof, so that the bag material 34 forms an enclosed receptacle 40 hanging from the now-deployed support frame 22. Waste is then placed in the receptacle 40 by passing the waste through the central aperture 32 (step 220). When the desired waste has been placed in the receptacle 40, and assuming that the receptacle 40 is not now full (step 230), the waste receptacle assembly 20 is pushed back into the retracted configuration and the door panel 16 closed (step 240). This arrangement helps control odors from the waste, in that the odors are mostly or entirely trapped in the compartment 14. In addition in the embodiments where the bag material 34 has a sanitizing function, the sanitizing function of the bag material 34 is given time to help sanitize the waste.

The above cycle of deployment, waste insertion, and retraction may be repeated as is desired, until the receptacle 40 becomes full. When the receptacle 40 is full (step 230), the receptacle 40 should be replaced. To replace the receptacle 40, the support frame 22 is moved to the deployed configuration if not already there, and the bag material 34 is pulled downward (step 250) so that the section 42 of the bag material 34 forming the receptacle 40 is lower than the cutter blade 50, with an adjacent section 44 of the bag material 34 connecting that "full" section 42 to the bag supply 30. See FIG. 5. The section 42 is then cut off (step 260), advantageously by moving the bag material 34 forward and laterally relative to the support frame 22 and the cutter blade 50, to form a separated section 60. To prepare the adjacent section 44 for use as the "new" receptacle, the lower end of the adjacent section is closed off by tying a knot in the lower part thereof (step 290). The waste receptacle assembly 20 may then be pushed back into the retracted configuration with the door panel 16 closed (step 240).

Figure 6:
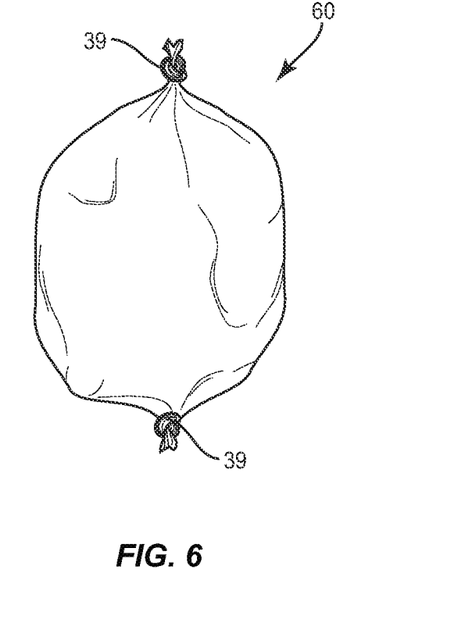
FIG. 6 shows a separated full receptacle with a top knot for closing the receptacle.

The top of the separated section 60 may be closed (step 270) by any suitable means, such as by tying an upper knot 39 to close the upper portion of the separated section 62. See FIG. 6. The separated section 60 may then be disposed of in any suitable fashion (step 280), such as by placing the separated section 60 in a trash can outside the vehicle.

Note that when there is insufficient bag material 34 remaining to form a suitable new receptacle, the existing bag supply 30 may be removed, and a new bag supply 30 placed in position, with the associated bag material 34 hanging down therefrom. Further, for simplicity, the discussion above has been in the context of the bag supply 30 being ring shaped. However, it should be understood that the bag supply 30 may be any other suitable shapes (e.g., hexagonal, octagonal, etc.) that circumferentially surround a central aperture 32.

In some embodiments, the door panel 16 is movably mounted to the front portion of the support frame 22, so as to be connected to the dashboard 12 via the support frame 22. For example, see FIG. 2. However, in some embodiments, the door panel 16 may instead be mounted directly to the dashboard 12. For example, the door panel 16 may be pivotally mounted to the dashboard 12 along one lateral side of the door panel 16, for sideways opening so to provide access to the waste receptacle. Note that the door panel 16 is not considered a portion of the waste receptacle assembly 20, even though the door panel 16 may be mounted directly to the support frame 22.

Figure 10:
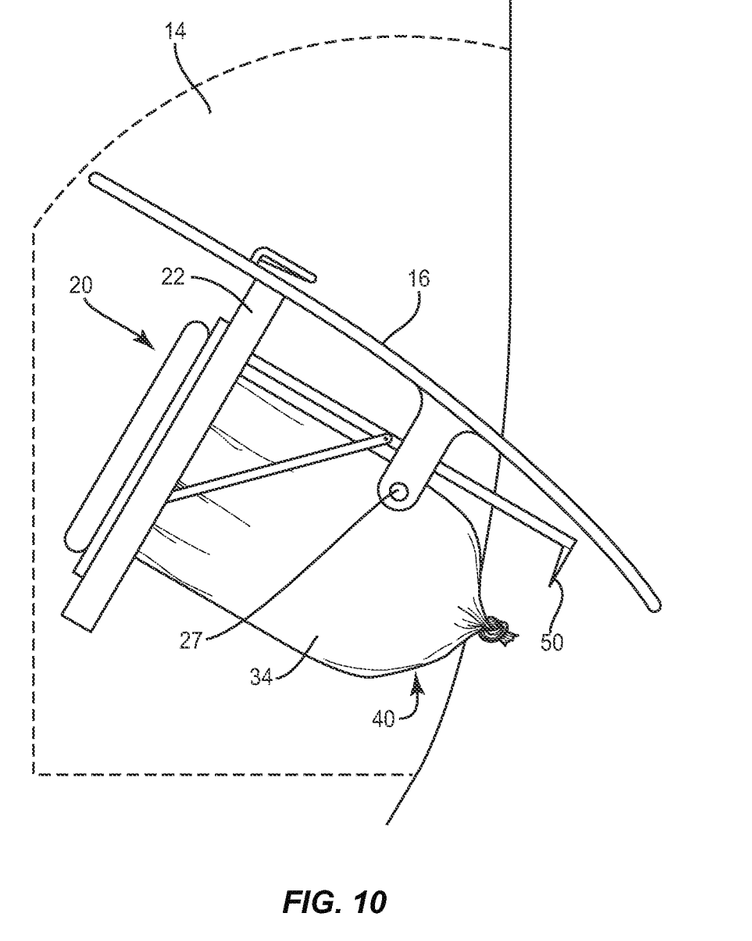
FIG. 10 shows the waste containment assembly of FIG. 8 in a second open configuration, with the waste receptacle assembly in the replacement configuration

The discussion above has been generally been in the context of the waste receptacle assembly 20 being slidable in and out relative to the dashboard 12 between the retracted configuration (FIG. 3) and the deployed configuration (FIG. 2). However, in some embodiments, the waste receptacle assembly 20 may alternatively (or additionally) be rotationally moveable between the retracted configuration and the deployed configuration. An example of such a rotationally movable embodiment is shown in FIGS. 1, 8-10. In such embodiments, the support frame 22 may be mounted to the door panel 16, and the door panel 16 may be rotationally mounted to the dashboard, advantageously at an approximate vertical midpoint of the door panel, such as by pivot mount 27. For such embodiments, the waste receptacle assembly may rotate about pivot mount 27 from the retracted configuration (FIG. 8) to the deployed configuration (FIG. 9), with the upper portion of the door panel 16 pivoted outward and the upper portion of the waste receptacle assembly 20 extending outward from the compartment 14, and the lower portion of the waste receptacle assembly 20 disposed in the compartment 14. From the deployed configuration (FIG. 9), the waste receptacle assembly 20 may be pivoted to the retracted configuration (FIG. 8), where both the upper portion and the lower portion of the waste receptacle assembly 20 are disposed in the compartment 14. From the retracted configuration (FIG. 8), the waste receptacle assembly 20 may be rotated in a direction opposite to the deployed configuration to a replacement configuration (FIG. 10). In the replacement configuration (FIG. 10), the lower portion of the door panel 16 is pivoted outward, the upper portion of the waste receptacle assembly 20 is disposed in the compartment 14, and the lower portion of the waste receptacle assembly 20 extends outward from the compartment 14. The replacement configuration allows the receptacle 40 to be replaced by pulling down the bag material 34, etc. generally as described above. Thus, the waste containment assembly 10 may be rotated between the closed configuration (FIG. 8), a first open configuration (FIG. 9) for waste insertion, and a second open configuration (FIG. 10) for replacement of the receptacle 40.

The disclosure of any patents and patent publications mentioned above are incorporated herein by reference in their entirety.

The present invention may, of course, be carried out in other specific ways than those herein set forth without departing from the scope of the invention. The present embodiments are, therefore, to be considered as illustrative and not restrictive.

What is claimed is:

1. A waste containment assembly movable between a first open configuration and a second closed configuration, comprising:
   a vehicle dashboard having a compartment therein;
   a door panel moveably connected to the vehicle dashboard for movement between a closed position and an open position;
   a waste receptacle assembly mounted to the vehicle dashboard for movement between a retracted configuration and a deployed configuration; wherein, in the deployed configuration, at least a portion of the waste receptacle assembly is forwardly disposed outside the compartment so as to be accessible by a user; wherein, in the retracted configuration, the waste receptacle assembly is disposed substantially within the compartment; the waste receptacle assembly comprising:
      a bag supply having a central aperture and a downwardly deployable tube of flexible plastic bag material; the central aperture opening on an interior surface of the bag material; a lower portion of the bag material having a first knot so that the bag material forms an enclosed but upwardly open hanging receptacle;
      a cutter blade mounted in spaced relation to the bag supply;
   wherein, with the waste containment assembly in the closed configuration:
      the waste receptacle assembly is in its retracted configuration;
      the door panel is in the closed position so as to close off the compartment;
      access to the central aperture is blocked;
   wherein, with the waste containment assembly in the open configuration:
      the door panel is in the open position;
      the waste receptacle assembly is in its deployed configuration with an upper portion thereof extending forwardly outward from the compartment;
      the central aperture is accessible from above;
   wherein the waste receptacle assembly is configured so that a user may cut off a receptacle segment of the bag material using the cutter blade when the lower portion of the bag material has been pulled down, leaving a remaining portion of the bag material disposed between the cutter blade and the bag supply.

2. The waste containment assembly of claim 1:
   wherein the waste receptacle assembly further comprises a support frame mounted in the compartment for sliding movement between a deployed position, where the support frame extends forwardly outward from the compartment, and a retracted position;

wherein, with the waste containment assembly in the open configuration, the support frame is in its deployed position so as to extend forwardly outward from the compartment.

3. The waste containment assembly of claim 2 wherein the cutter blade is mounted to the support frame in spaced relation to the bag supply.

4. The waste containment assembly of claim 2, wherein the support frame is biased toward its deployed position.

5. The waste containment assembly of claim 2, wherein the door panel is mounted to the support frame.

6. The waste containment assembly of claim 1:
wherein the waste receptacle assembly is mounted to the dashboard for pivoting movement between the retracted configuration, the deployed configuration, and a replacement configuration;
wherein, in the deployed configuration, the upper portion of the waste receptacle assembly extends forwardly outward from the compartment and a lower portion of the waste receptacle assembly is disposed in the compartment;
wherein, in the replacement configuration, the lower portion of the waste receptacle assembly extends forwardly outward from the compartment and the upper portion of the waste receptacle assembly is disposed in the compartment;
wherein, in the retracted configuration, both the upper portion and the lower portion of the waste receptacle assembly are disposed in the compartment.

7. The waste containment assembly of claim 1, wherein the waste container assembly is configured such that the central aperture is blocked while the waste receptacle is positioned so that cutting blade is cutting the bag material.

8. The waste containment assembly of claim 1, wherein the bag supply is pivotable relative to the compartment.

9. The waste containment assembly of claim 1, wherein the bag material comprises a sanitizing bag material.

10. The waste containment assembly of claim 1, wherein the bag supply is ring shaped.

11. A method of disposing of waste, the method comprising:
depositing waste in a waste receptacle of a waste containment assembly while the waste containment assembly is in an open configuration, the waste containment assembly being moveable between the open configuration and a closed configuration, the waste containment assembly comprising:
a vehicle dashboard having a compartment therein;
a door panel moveably mounted to the vehicle dashboard for movement between a closed position and a first open position;
a waste receptacle assembly mounted to the dashboard for movement between a retracted configuration and a deployed configuration; wherein, in the deployed configuration, at least a portion of the waste receptacle is forwardly disposed outside the compartment so as to be accessible by a user; wherein, in the retracted configuration, the waste receptacle assembly is disposed rearwardly with respect to the deployed configuration and disposed substantially within the compartment; the waste receptacle assembly comprising:
a bag supply having a central aperture and a downwardly deployable tube of flexible plastic bag material; the central aperture opening on an interior surface of the bag material; a lower portion of the bag material having a first knot so that the bag material forms an enclosed but upwardly open hanging receptacle;
a cutter blade mounted in spaced relation to the bag supply;
wherein, with the waste containment assembly in the closed configuration:
the waste receptacle assembly is in its retracted configuration;
the door panel is in the closed position so as to close off the compartment;
access to the central aperture is blocked;
wherein, with the waste containment assembly in the open configuration:
the door panel is in the open position;
the waste receptacle assembly is in its deployed configuration with an upper portion thereof extending forwardly outward from the compartment;
the central aperture is accessible from above;
thereafter, moving the waste containment assembly to its closed configuration.

12. The method of claim 11, further comprising:
pulling the bag material downward so as to extend below the door panel in a separation configuration;
cutting a lower portion of the bag material from an adjacent section using the cutter blade while the bag material is in the separation configuration so as to form a separated bag;
thereafter, tying a second knot in the adjacent section so that the adjacent section of bag material, still connected to the bag supply, forms another enclosed but upwardly open hanging receptacle;
thereafter, moving the waste receptacle assembly to its retracted configuration.

13. The method of claim 12, further comprising disposing of the separated bag.

14. The method of claim 12, further comprising tying off the separated bag at a location in spaced relation to the first knot.

15. The method of claim 11, further comprising thereafter and in sequence:
moving the waste containment assembly to its open configuration;
placing other waste in the receptacle;
moving the waste containment assembly to its closed configuration.

16. The method of claim 11, further comprising at least partially sanitizing the waste by contact with the bag material.

17. The method of claim 11, further comprising moving the waste receptacle assembly from its retracted configuration to its deployed configuration by non-rotationally sliding the waste receptacle assembly forwardly outward from the compartment.

18. The method of claim 12:
wherein the waste receptacle assembly further comprises a support frame mounted in the compartment for sliding movement between a deployed position, where the support frame extends forwardly outward from the compartment, and a retracted position;
wherein, with the waste containment assembly in the open configuration, the support frame is in its deployed position;
wherein, with the waste containment assembly in the closed configuration, the support frame is in its retracted position.

19. The method of claim 11, further comprising moving the waste receptacle assembly from its retracted configuration to its deployed configuration by pivoting an upper portion of the waste receptacle assembly forwardly outward from the compartment.

20. The method of claim 11:
- wherein the waste receptacle assembly is mounted to the dashboard for pivoting movement between the retracted configuration, the deployed configuration, and a replacement configuration;
- wherein, in the deployed configuration, the upper portion of the waste receptacle assembly extends forwardly outward from the compartment and a lower portion of the waste receptacle assembly is disposed in the compartment;
- wherein, in the replacement configuration, the lower portion of the waste receptacle assembly extends forwardly outward from the compartment and the upper portion of the waste receptacle assembly is disposed in the compartment;
- wherein, in the retracted configuration, both the upper portion and the lower portion of the waste receptacle assembly are disposed in the compartment;
- the method further comprising thereafter moving the waste receptacle assembly from its retracted configuration to its replacement configuration, and while the waste receptacle assembly is in the replacement configuration, cutting the bag material with the cutter blade.

* * * * *